United States Patent [19]
Pratscher

[11] Patent Number: 4,653,221
[45] Date of Patent: * Mar. 31, 1987

[54] ANIMAL TRAP

[76] Inventor: Andrew J. Pratscher, 267 Cornell, Calumet City, Ill. 60409

[*] Notice: The portion of the term of this patent subsequent to May 29, 2001 has been disclaimed.

[21] Appl. No.: 795,522

[22] Filed: Nov. 6, 1985

Related U.S. Application Data

[63] Continuation-in-part of Ser. No. 589,557, Mar. 14, 1984, Pat. No. 4,596,087, which is a continuation-in-part of Ser. No. 427,718, Sep. 24, 1982, Pat. No. 4,450,648.

[51] Int. Cl.⁴ .......................................... A01M 23/04
[52] U.S. Cl. .......................................... 43/64; 43/73; 43/79; 43/68
[58] Field of Search .................. 43/64, 68, 69, 70, 73, 43/74, 79, 80

[56] References Cited

U.S. PATENT DOCUMENTS

| 114,062 | 4/1871 | Stowe | 43/68 |
|---|---|---|---|
| 214,013 | 4/1879 | Wilford | 43/68 |
| 829,960 | 9/1906 | Mackel | 43/64 |
| 857,879 | 6/1907 | Hill | 43/73 |
| 1,436,272 | 11/1922 | McElfresh | 43/69 |
| 2,273,008 | 2/1942 | Fisher | 43/68 |
| 4,145,834 | 3/1979 | Quigley | 43/73 |
| 4,154,016 | 5/1979 | Reyes | 43/69 |
| 4,238,903 | 12/1980 | Mazzei | 43/69 |
| 4,253,264 | 3/1981 | Souza | 43/73 |
| 4,255,891 | 3/1981 | Chen | 43/64 |

FOREIGN PATENT DOCUMENTS

532206  8/1931  Fed. Rep. of Germany .......... 43/79

Primary Examiner—Nicholas P. Godici
Assistant Examiner—Kurt Rowan
Attorney, Agent, or Firm—Thomas W. Tolpin

[57] ABSTRACT

A compact industrial animal trap is provided to effectively, continually and rapidly exterminate rodents and other animal pests in a reliable, efficient and safe manner. The animal trap has a disposal chamber and an elongated killing chamber with a kill pad or other killing means. In the preferred form, the disposal and killing chambers are separated by a vertically moveable scraper wall, the opposite ends of the killing chamber have entrance doors, and the killing chamber has a laterally moveable sidewall and floor to push the killed animal from the killing chamber into the disposal chamber.

19 Claims, 15 Drawing Figures

FIG_10_

FIG_11_

Fig. 14

ANIMAL TRAP

CROSS REFERENCES TO RELATED APPLICATIONS

This application is a continuation-in-part of application Ser. No. 589,557 filed Mar. 14, 1984, for an animal trap, classified in Group Art Unit 325, before Examiner K. Rowan, now allowed as U.S. Pat. No. 4,596,087, which is a continuation-in-part of U.S. Pat. No. 4,450,648, Ser. No. 427,718, filed Sept. 24, 1982, issued May 29, 1984.

BACKGROUND OF THE INVENTION

This invention pertains to industrial animal traps, and more particularly, to devices for killing rodents and other animal pests.

In the farming, harvesting, and storing of food grains, it has been estimated that as much as 30% of the food products are lost to rodents (rats, mice, etc.) whether the food be in the field, in a silo, or in transportation. The worldwide loss due to rodent consumption has been estimated to run into billions of dollars.

In the past, control of rodents and other animal pests have been usually confined to chemical pesticides. Chemical pesticides, however, are not usually effective to efficiently eliminate and dispose of large numbers of rodents without contaminating or otherwise adversely effecting the soil, atmosphere, and other areas of the environment.

Spring-loaded animal traps and other mechanical devices for entrapping and killing rodents and other animal pests have been known for centuries. Typifying these traps are those shown in U.S. Pat. Nos. 114,062; 214,013; 363,554; 813,333; 829,960; 857,879; 1,002,082; 1,120,114; 1,436,272; 2,061,123; 2,273,008; 2,531,568; 4,145,834; 4,154,016; 4,238,903; 4,253,264; and 4,255,891 and German Patent No. 532,206. These traps have met with varying degrees of success.

Many of these prior art traps, however, suffer from the disadvantage that large numbers of rodents cannot be killed since the traps must be manually reset after each kill. Furthermore, many of these traps are complex, cumbersome, bulky, and ineffective.

It is therefore desirable to provide an improved animal trap which overcomes most, if not all, of the above problems.

SUMMARY OF THE INVENTION

An improved animal trap is provided which effectively destroys vast numbers of rodents (rats, mice, etc.), pigeons, crows, and other animal pest in a safe manner. Desirably, the novel animal trap can automatically and efficiently kill thousands of rats or other animal pests with little or no maintenance and repair.

The animal trap is quick, virtually bloodless, and economical. It can eliminate rodents and many other types of undesirable animals without dangerous and hazardous chemical pesticides.

It can be pneumatically, mechanically, or magnetically operated or powered by solar energy or electricity, if desired. The trap can be activated by a photoelectric switch or by other triggering means. The sequence of operation of the trap can be controlled by a pneumatic logic board, electromagnetic relays, electric circuit boards or chips, and/or mechanical timing mechanisms, such as cams, toggles, geneva wheels, gears, etc.

Desirably, the automatic animal trap is compact, dependable and effective. To this end, the animal trap has a single unitary killing chamber with moveable doors, walls and floor which automatically and sequentially operate, when a rodent or other animal enters the trap and trips a detector or sensor, such as a pressure-sensitive trigger switch (pressure-sensative whiskers or feeler switches). Other types of detectors (sensors), such as photoelectric switches, can also be used. The animals are attracted into the feeding chamber by the odor, scent, and aroma of bait from an adjacent bait source which can permeate and pass into the feeding chamber through a screen, conduit, or other openings.

The animal can enter the killing chamber through an entrance door, access opening and passageway at either end of the killing chamber. After the animal enters the killing chamber and trips the detector (sensor), the entrance doors are automatically closed, by power-driven pistons or plungers and auxiliary springs to prevent the animal from leaving the killing chamber. In the killing chamber, the animal is impaled or otherwise killed. In the preferred form, retractable power-driven spikes enter the killing chamber to quickly and virtually bloodlessly kill the animal. Alternative ways of killing the animal in the killing chamber can also be employed, such as by crushing (compressing) the animal against a wall or floor of the killing chamber with the piston or plunger, or by decapitation (guillotining), by liquified $CO_2$ or fluids, by vacuum withdrawal of breathing air, electrocution, lethal injections, drowning, etc.

After the animal has been killed, the killing device is retracted or purged. An interior wall or panel adjacent a discharge (disposal) chamber or holding compartment is opened and the floor and exterior wall or panel are moved by one or more power-driven pistons or plungers to push the dead animal into the discharge chamber or holding compartment for eventual disposal. Thereafter, the pistons or plungers are retracted to move the walls and floor back to their initial starting position and the entrances at both ends of the killing chamber are opened to reset the trap.

In one form, the killing and disposal chambers (compartments) are in side-by side, general horizontal alignment and/or lateral registration with each other for mechanical simplicity and stability. Such construction is more attractive to many animals who are too lazy to walk up a ramp or otherwise climb up to the top chamber of a vertical trap. It also substantially reduces the overall height of the trap which is useful in places with limited height requirements.

The discharge (disposal) chamber is preferably in the form of a removable tray or slidable detachable drawer and can be at a slight incline or pitch, if desired. The reliable trap is also elongated and compact so it can be placed along a wall where rodents prefer to travel.

A more detailed explanation of the invention is provided in the following description and appended claims taken in conjunction with the accompanying drawings.

DETAILED DESCRIPTION OF THE PREFERRED EMBODIMENTS

Referring now to FIGS. 1-5 of the drawings, a vertical animal trap 10 provides an industrial animal killing device for killing rodents (rats, mice, etc.), pigeons, crows, and other animals. While the animal trap is described with particular reference to rodents, it is to be understood that the animal trap can also be used for trapping, killing, and disposing of other animals.

Figures 1, 2, 3:
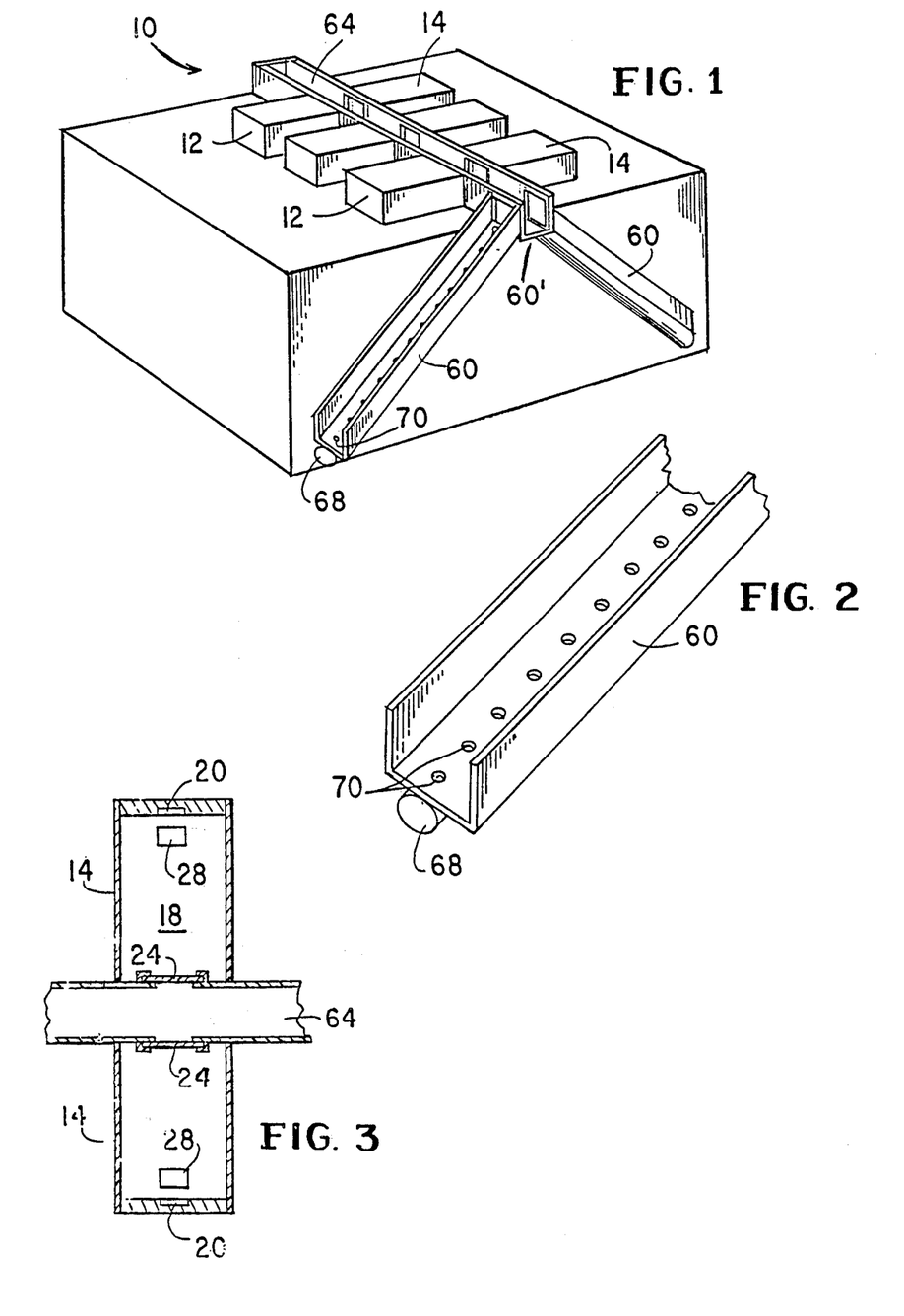
FIG. 1 is a perspective view of a vertical animal trap in accordance with principles of the present invention.
FIG. 2 is a perspective view of part of the inclined ramp and scent-carrying bait-conduit leading up to the top of the vertical animal trap.
FIG. 3 is a fragmentary cross-sectional view of the top of the vertical animal trap.

As shown in FIG. 1, a plurality of rodent feeding and killing units 12 are provided on a receptacle or container, so that many rodents can be exterminated at the same time. Each unit 12 is made up of an upper feeding chamber 14 (FIGS. 4 and 5) and a lower killing chamber 16 directly below the feeding chamber, so that the floor 18 of the upper feeding chamber also forms the ceiling of the lower killing chamber.

Figure 4:
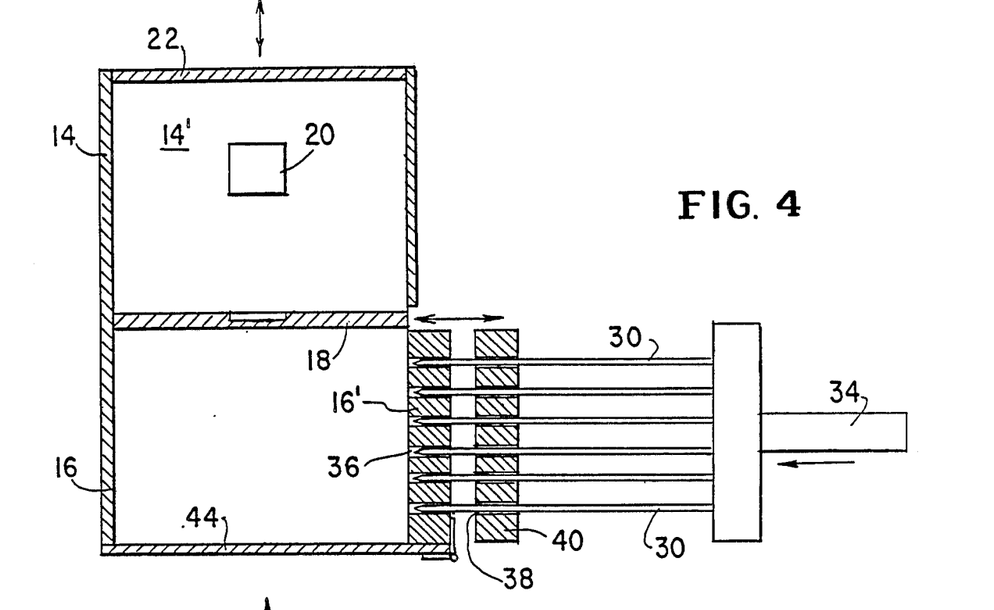
FIG. 4 is a cross-sectional view of the side of the vertical animal trap when the trap is open.
Figure 5:
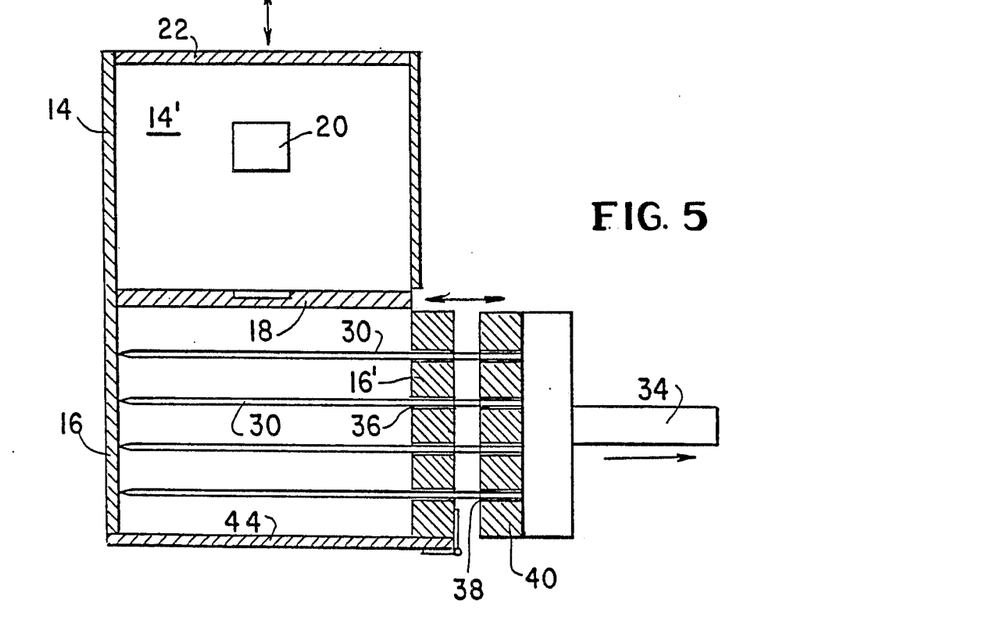
FIG. 5 is a cross-sectional view of the side of the vertical animal trap when the trap is open.

The upper feeding chamber, which is preferably cubical in configuration, though other shapes can be used, is provided with bait, which will lure a rodent into the interior of the chamber. Such bait is typically peanut butter or a mixture of peanut butter and grain, such as oat or wheat. The bait is situated in a cavity 20 of the end wall 14' of the upper chamber 14, which cavity is covered by a screen mesh, so that the aroma from the food is allowed to permeate its surroundings, yet prevent the rodent from actually eating it, so that the same bait may be used a number of times to attract a rodent. The screen mesh which covers the cavity in the end wall 14' lies flush with the inner surface of the wall, so that the ceiling 22 of the upper chamber may be lowered toward the floor 18, which operation is described below.

The animal trap has a trap door 24 (FIG. 3) that is normally in a raised, open position to allow entry of a rodent into the interior of the upper feeding chamber. A pressure sensitive pad or activating switch 28 is provided on the floor 18 of the upper chamber. Upon a rodent's treading upon the pressure sensitive pad, a circuit is closed that activates a normally closed solenoid switch, which in turn activates an air cylinder to speedily lower the door 24 into its lower, closed position, to seal the rodent in the upper chamber. When the trap door is lowered into its closed position, the ceiling 22 of the upper feeding chamber is lowered vertically and the floor 18 is moved horizontally sideways, so that as the floor is slid out from under the rodent, the rodent is forced to fall into the lower killing chamber 16. Since some rodents are of larger size than others, the possibility exists that a portion of the rodent, such as its head, may extend above the plane of the floor 18 when the the rodent is entrapped in the lower killing chamber. In order to assure that the entire rodent is within the confines of the killing chamber, the ceiling 22 is lowered downwardly until it reaches near the plane of the floor 18. Upon reaching this location, the floor is again reciprocated back to its original closed position, thereby completing the entrapment of the rodent in the lower killing chamber.

Air cylinders reciprocate the ceiling and floor along channeled pathways or rails in response to the operation of a solenoid switch. The exact timing sequence can be readily achieved with conventional sensing switches located near the end point of travel of the ceiling, floor, and trap door.

Once the trapped rodent is located in the killing chamber 16, it can be destroyed effectively without having any of its remains positioned within the upper feeding chamber. The bait does not interfere with the movement of the ceiling as it descends toward the lower killing chamber since it is enclosed in a cavity of the end wall 14'.

Once the rodent is positioned in the lower killing chamber, a set of spikes 30 are forcibly protruded into the interior of the killing chamber to impale the rodent and destroy it. The spikes are mounted on a mounting plate which is affixed to a piston 34 operated by an air cylinder. The sidewall 16' (FIG. 4) of the killing chamber is provided with a plurality of passageways 36 through which the ends of the spikes project to kill a rodent. The shank portions of the spikes are inserted through openings 38 in a guide wall 40. The openings are in alignment with and are slightly larger than the spike passageways so that each spike, when in its extended operating position, will extend through a respective passageway and opening. The guide wall 40 is spaced from the sidewall 16', as shown in FIG. 4, so that when the spikes are retracted after impaling a rodent any residue from the remains of the rodent will fall down the gap between the guide wall and the sidewall.

After the rodent has been impaled in the killing chamber, it must be disposed of, which is achieved by pivotally mounting the floor 44 of the killing chamber. The floor and side wall 16' rotate as a unit in the counterclockwise direction, while the upper portion of the side wall enters the interior of the killing chamber and forces the killed rodent downwardly through the space vacated by the floor. After the rodent is disposed in a receptacle container, the unit is rotated in the clockwise direction to its original position as shown in FIG. 4. The unit can be rotated by any conventional means, such as a swivel mounted piston-cylinder arrangement.

As the sidewall 16' is rotated in the counterclockwise direction as viewed in FIG. 4, the passageways 36 will tend to move to a vertical incline, which will aid in the removal of any material stuck therein from the ends of the spikes. Such removal is accomplished by gravity and by the reaction to the thrust created upon the return of the side wall to its original position when rotated in the clockwise direction. Such removal is advantageous to prevent foul smelling odors from occurring in the killing chamber, which may permeate to the outside via the floor or other avenues of escape that could warn other rodents that a trap is present.

In an alternative form, the floor 44 may be reciprocated in the horizontal direction to deposit the killed rodent into the receptacle. In this alternative, the sidewall 16' is fixed and the floor is reciprocated by an air cylinder via grooved channels in the bottom surface of the sidewall 16'.

The upper feeding chamber of the animal trap can be located above the container (receptacle), while the lower killing chamber can be located below the top of the container. More units 12 than that shown in FIG. 1 may be provided in a similar manner.

To allow a rodent to get to the feeding chamber and enter through the opening formed by the trap door 24, conduits 60 (FIGS. 1 and 2) are provided. The conduits are preferably U-shaped channel members which at their top end communicate with a walkway 64. The conduits guide the rodent past a series of open feeding chambers.

To first attract a rodent to enter the conduit, each U-shaped channel member is provided with a closed end pipe or conduit 68 that has a series of holes 70 formed in its surface. The pipe holes communicate with a series of holes in the conduits 60. Each end of the pipe is connected to a common pipe that has one of its ends affixed to a sidewall so that they are in fluid communication with the interior of the feeding chamber. The aroma from the bait stored in the feeding chamber is passed along the pipes to the conduit trail. A rodent entering the bottom of any conduit will immediately smell the aroma from the food stored in the feeding chamber and will be led along the conduit into the feeding chamber by the same smell.

In use, the sequence of operation is as follows. A rodent will travel up a conduit, attracted by the pleasant aroma of the bait, until it enters the feeding chamber via the open door. When the rodent tries to locate the bait and eat it, it will depress the pressure sensitive pad and thereby close the circuit to the solenoid switch operating the air cylinder of the door. Closing of the circuit, causes the door to close swiftly, as well as causes the ceiling of the feeding chamber to descend and the floor of the feeding chamber to be moved horizontally outwardly so that the rodent will fall into the killing chamber below. Next, the sliding floor of the feeding chamber will return to its normally closed position and the ceiling will be raised to its normal height. Upon entry of the rodent into the killing chamber, the spikes will be activated to impale the rodent and kill it, and then the rotating unit of the floor and sidewall of the killing chamber will be rotated counterclockwise to dispose of the rodent into the receptacle below. Simultaneously with the rotation of the unit, the spikes are withdrawn to their original retracted position. Suitable relay switches are provided to control the sequence of operation, which switches can be of conventional design. After a sufficient time has elapsed, for example two days, the receptacle's container is emptied of its contents and new supplies of bait are provided.

The air cylinders used to control the movement of the feeding chamber door, floor, and ceiling, and the rotation of the killing chamber floor and sidewall, is preferably a spring-return solenoid-controlled air cylinder with a bore of 1⅛ inches and a stroke of 4 inches, such as provided by Model SRS manufactured by Carter Controls, Inc. of Lansing, Ill. To operate the spikes, an air cylinder having a 3 inch bore and a 4 inch stroke is preferably used, which will provide a force of about 700 pounds for an air pressure of 100 psi, such as an air cylinder provided by Carter Controls, Inc.

The horizontal animal trap 100 shown in FIGS. 6-9 is similar in many respects to the vertical animal trap shown in FIGS. 1-5, except that the rectangular-shaped feeding, killing, and discharge (receptacle) chambers or compartments 102, 104, and 106 are in side-by-side or end-to-end horizontal and lateral alignment, communication and registration with each other so that the rodent or other animal does not need to walk up a ramp or otherwise climb up the trap before entering the access opening 108 of the feeding chamber. It has been found that the horizontal animal trap is even more efficient and effective in killing rodents and other animals than the vertical trap.

While the horizontal animal trap is described with particular reference to eliminating rodents (rats, mice, etc.), it is to be understood that the horizontal animal trap is also useful in attracting, trapping, killing, and disposing of pigeons, crows, rabbits, raccoons, and other animals. Furthermore, while the ceiling, floor, and vertical walls of the chambers are preferably stationary or fixed, except as described below, one or more of the ceiling, floor, or walls can be made to slide, reciprocate, pivot, or otherwise move, if desired.

In the preferred embodiment, the feeding, killing, and discharge chambers have a common, horizontal, coplanar, stationary ceiling 110 and a common, horizontal, coplanar, stationary floor 112. The ceiling of the killing chamber has openings 114 for receiving a set of receiving a set of retractable vertical spikes 116 which are mounted on a crossbar or piston 118 driven by one or more pneumatic cylinders 120 and rods 122. The floor or side of the feeding chamber can have bait holes or passageways 124 through which the fragrance, scent, and aroma of the bait from a slidably removable, U-shaped bait tray can pass. If desired, laterally or transversely moveable spikes can be used instead of the vertical spikes.

A vertical piston, ram, or plunger provides a moveable, vertical, front drive wall 126 which is reciprocatingly driven in the horizontal direction by one or more horizontal pneumatic cylinders 128 and rods 129. The power driven front wall can be controlled by a timing mechanism, such as a cam 130 and cam follower 131. Cables and other timing mechanisms can also be used. The front wall can have downwardly extending wheels 132 or bearings to slide and roll upon the floor or rails or tracks mounted on the floor. The cylinders are connected to a suitable power source (not shown), such as a compressor or air tank controlled by one or more valves and pneumatic logic boards or limit switches. Other power sources, such as batteries, generators, motors, engines, pumps, or solar energy collectors, can be used with other types of cylinders, such as solenoid-activated electromagnetic cylinders, hydraulic cylinders, etc.

An intermediate common vertical wall or panel 133 extends between and separates the feeding chamber from the killing chamber. A common vertical end wall 134 separates the killing chamber from the discharge or disposal chamber. The overhead cylinder or other cylinders drive the intermediate and end walls upwardly to open positions substantially out of the chamber and downwardly to normally closed positions. If desired, the intermediate and end walls can move sideways (transversely) to an open position rather than upwardly.

Figure 6:
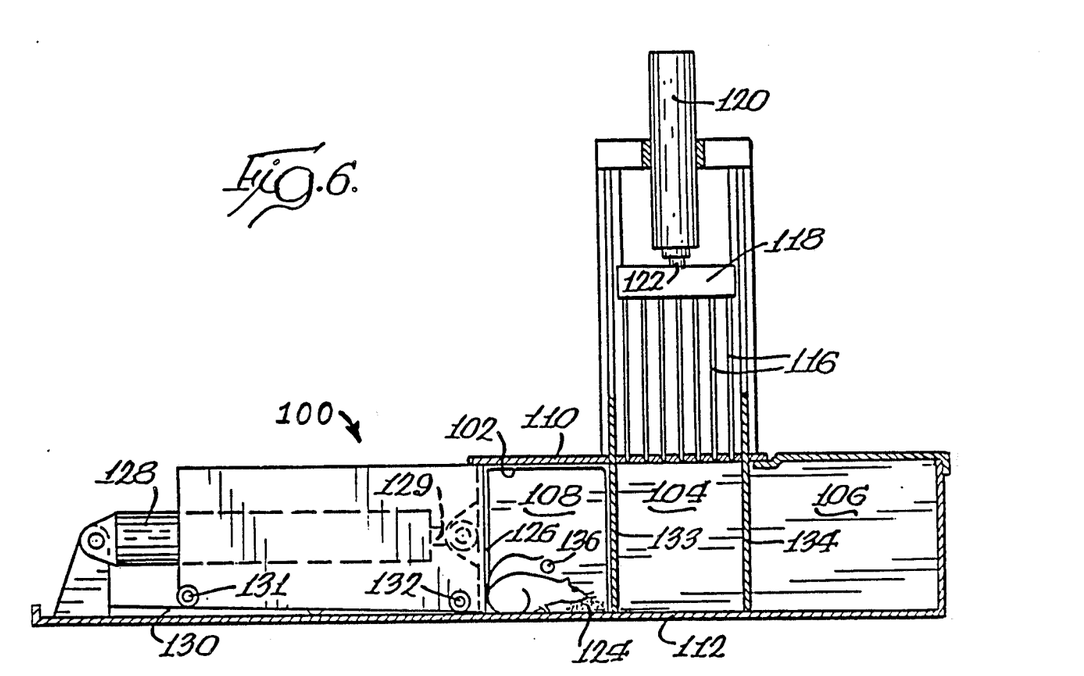
FIG. 6 is a cross-sectional view of a horizontal animal trap in accordance with principles of the present invention with an animal in the feeding chamber.

In operation, the rodent enters the opening of the feeding chamber as shown in FIG. 6. An activating sensor or switch 136, such as a magnetic switch, senses the presence of the rodent when the rodent interrupts the magnetic field in the feeding chamber and the trap by activating the power source and associated pneumatic or electric circuitry or limit switches. Other sensors or switches can be used, such as photoelectric switches, pressure sensitive switches, heat sensitive switches, etc.

Figure 7:
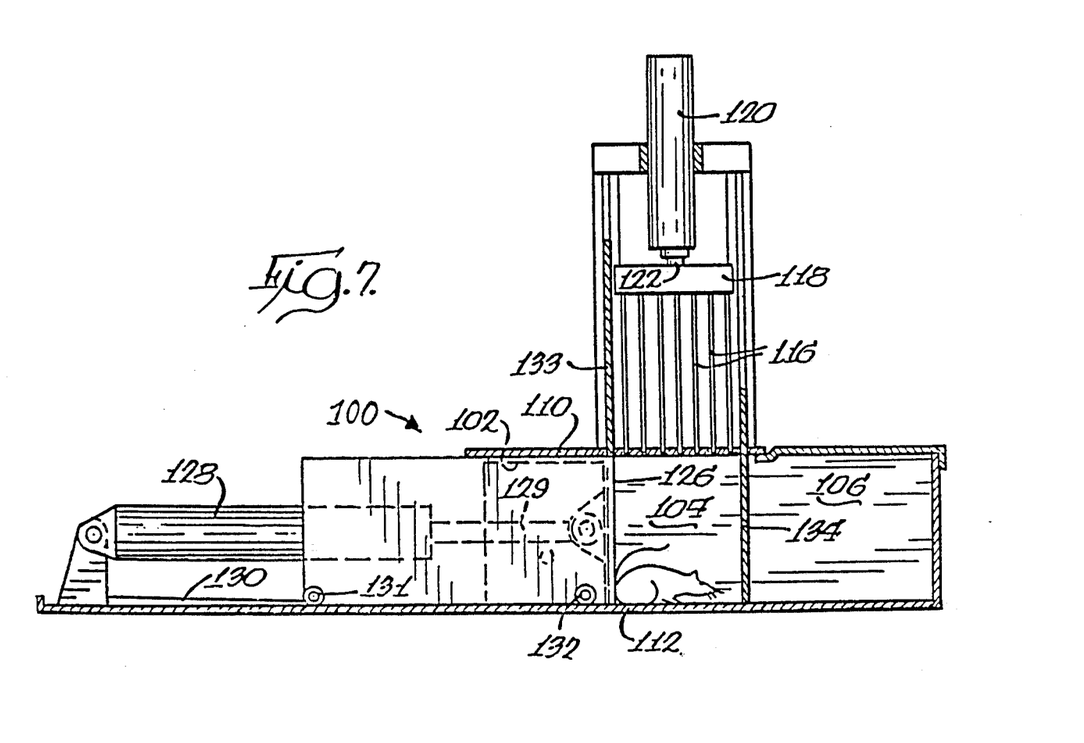
FIG. 7 is a cross-sectional view of the horizontal animal trap after the animal has been pushed into the killing chamber.

After the circuit is tripped (activated), the intermediate wall 133 is lifted to its open position and the front drive wall 126 pushes the rodent into the killing chamber by moving to the intermediate position separating the killing chamber and the feeding chamber (the former, normally closed position of the intermediate wall) as shown in FIG. 7. The vertical side flange which extends laterally along the side of the front wall provides a slidable door that closes the access opening to the feeding chamber when the front wall moves rearwardly to the intermediate position.

Figure 8:
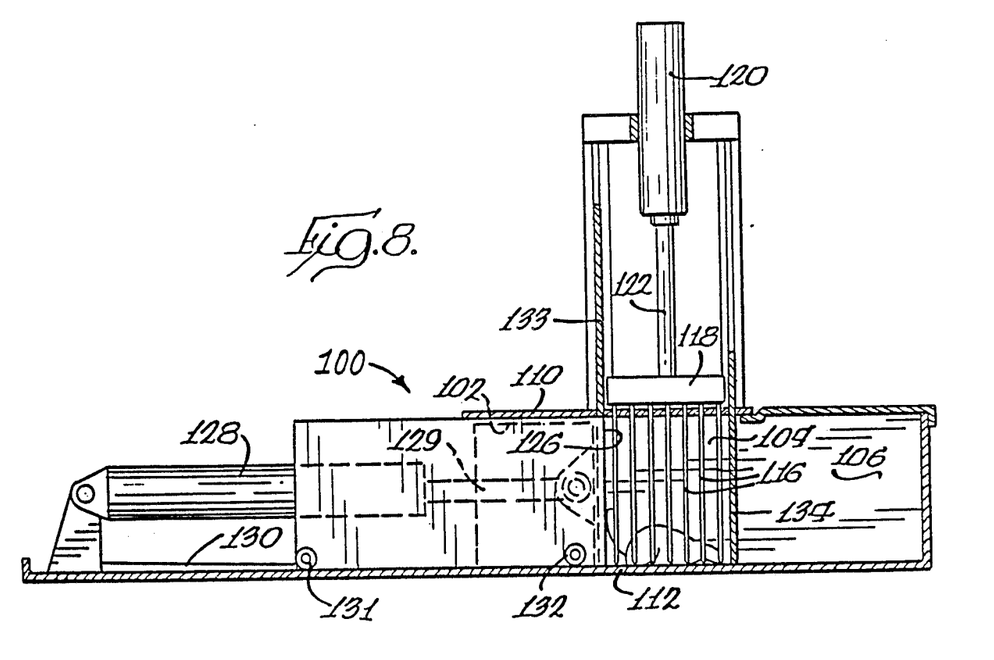
FIG. 8 is a cross-sectional view of the horizontal animal trap during the killing sequence.

In the killing chamber, the spikes 116 are quickly driven into the rodent to kill the rodent as shown in FIG. 8 and rapidly retracts out of the killing chamber. Such action has been found to be virtually bloodless.

Figure 9:
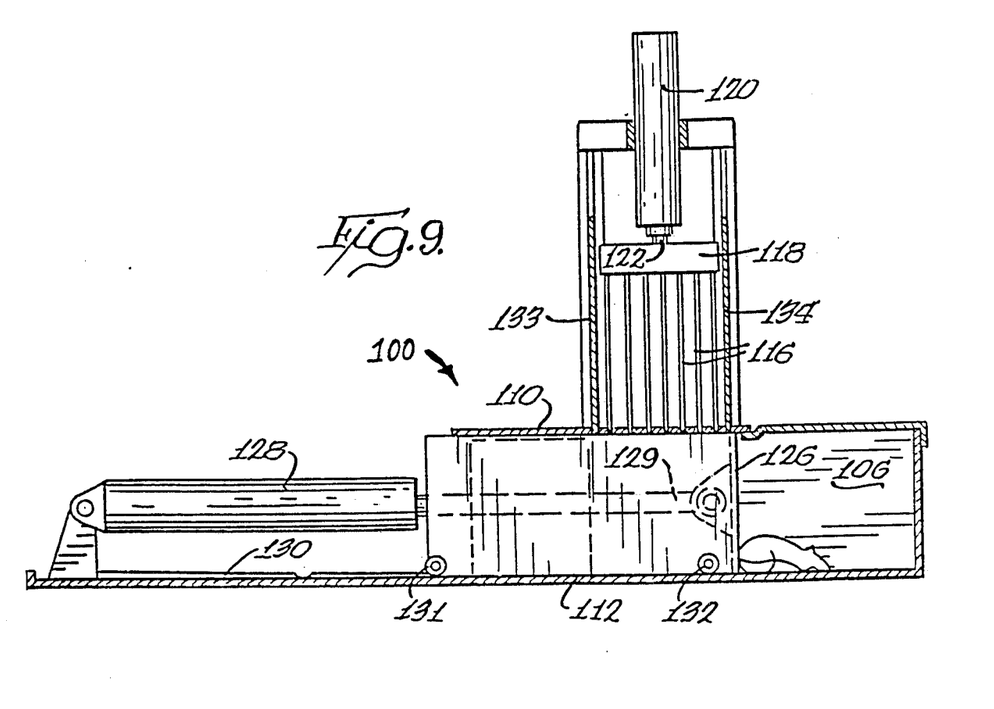
FIG. 9 is a cross-sectional view of the animal trap showing the animal being pushed into a discharge chamber or receptacle.

Thereafter, the end wall 134 is lifted to its open position and the front drive wall pushes the dead rodent into the discharge chamber by moving to its rearward position separating the discharge chamber and the killing chamber (the former, normally closed position of the end wall), as shown in FIG. 9. This completes the end of the cycle and the front, intermediate, and end walls are returned to their normally closed or starting positions as shown in FIG. 6. The discharge chamber is periodically emptied as desired.

Figure 10:
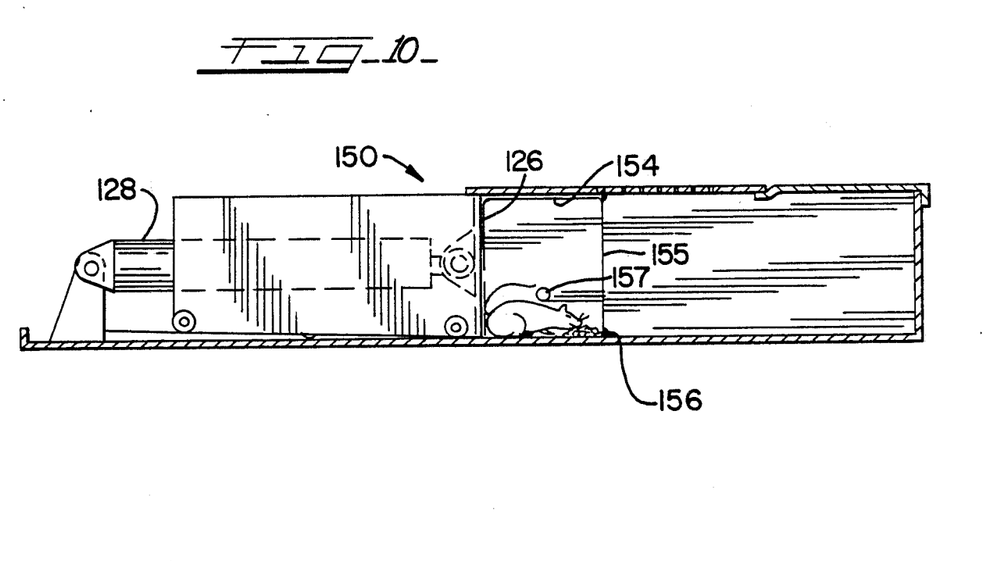
FIG. 10 is a cross-sectional view of a horizontal animal trap similar to FIG. 7 but with gaseous killing means instead of spikes.
Figure 11:
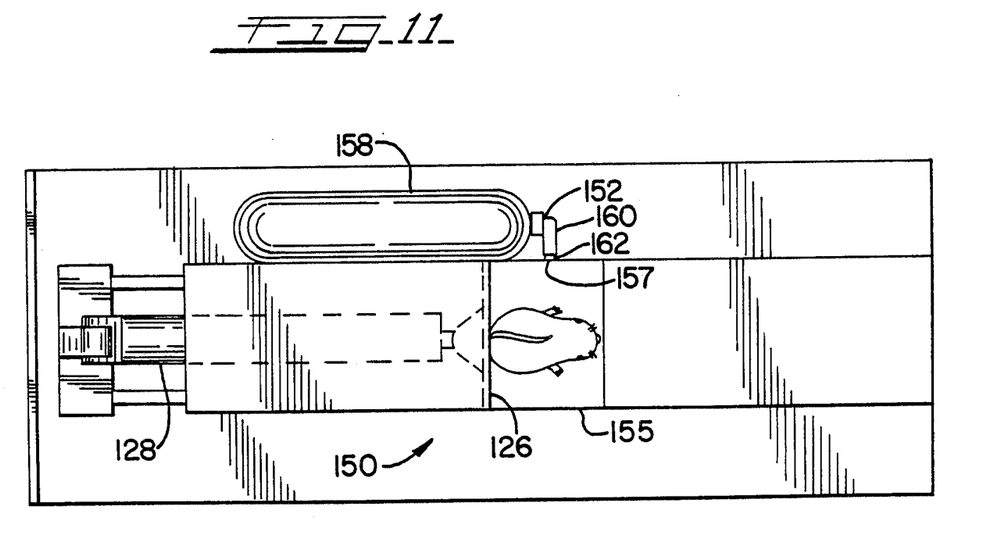
FIG. 11 is a top view of the animal trap of FIG. 10.
Figure 12:
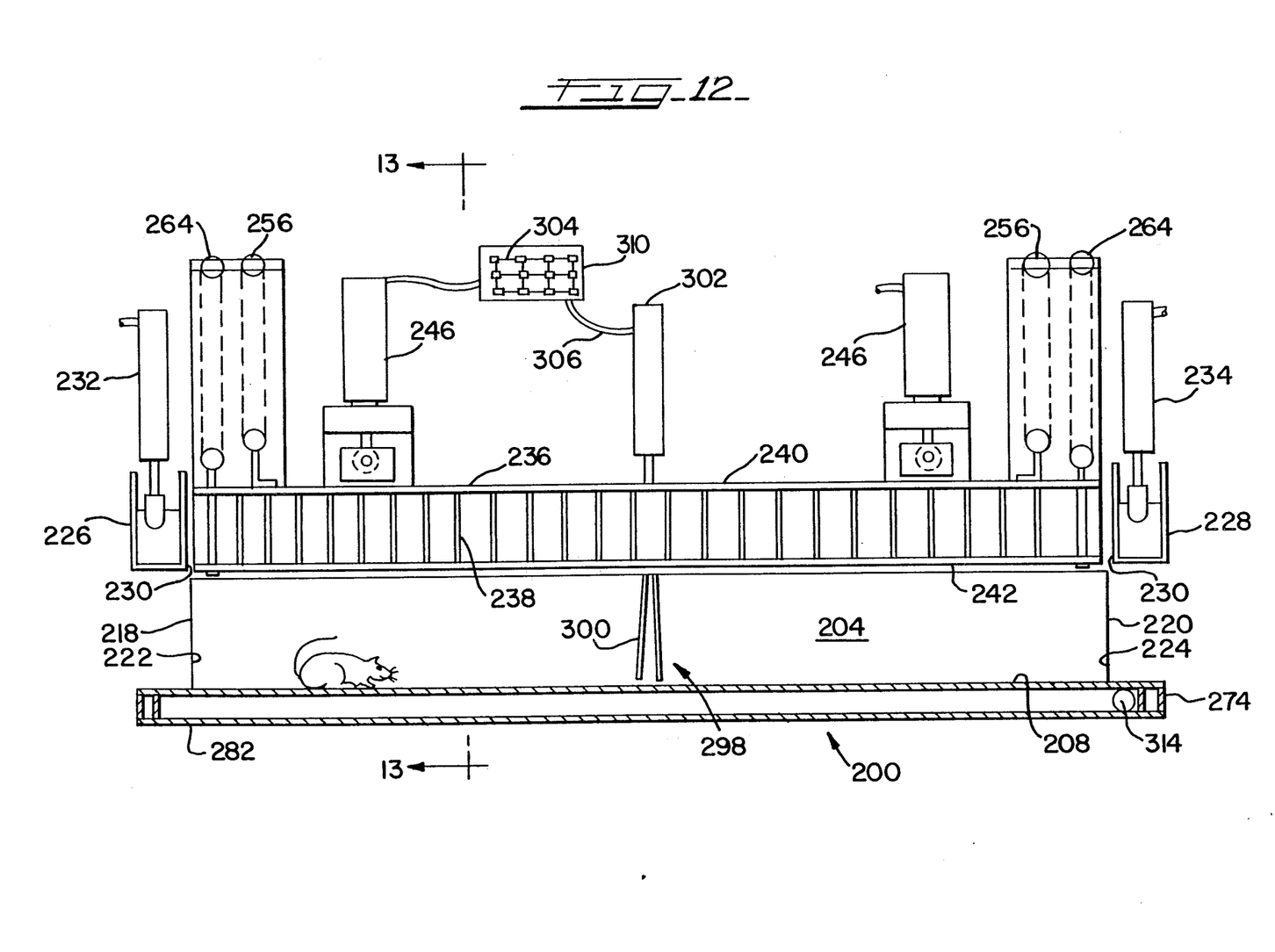
FIG. 12 is a fragmentary front view of another horizontal animal trap in accordance with principles of the present invention with the animal in the elongated killing chamber.

The horizontal animal trap 150 shown in FIGS. 10 and 11 is similar to the horizontal animal trap 100 shown in FIGS. 6–9, except that a gas injector (gaseous killing means) 152 is used to kill the animal instead of spikes. The gas injector and ceiling 154 of the killing chamber 155 cooperate with the killing chamber's floors and walls to provide a gas chamber 155 (gaseous killing chamber). The gas injector can be placed along side of the killing chamber to reduce the height of the animal trap. Gas impervious seals or caulk 156 is placed along the gas chamber to prevent egress and leakage of gas. The gas can comprise any gas which displaces and is heavier than the air and will kill the animal. In use, the gas is injected into the killing chamber through one or more gas holes or passageways 157 and occupies at least the bottom portion of the killing chamber since it is heavier than the air. Desirably, substantially all the air in the killing chamber is replaced by the gas. In the preferred embodiment of the gas chamber, carbon dioxide gas is predominantly used in the gas injector to kill the animal as well as to power the cylinders 128, pistons and rods which move the walls 126. The carbon dioxide is supplied by a carbon dioxide ($CO_2$) supply tank 158, cylinder or cartridge and is injected into the gas chamber by a plastic hose or tubing 160 with one or more optional spray nozzles 162. Such a gas can take 30 seconds or less to kill a rat. Nitrogen gas can also be used in the gas injector. The other parts and components of the animal trap are similar to those shown in FIGS. 6–9.

The compact horizontal animal trap 200 shown in FIGS. 12–15 is similar in many respects to the animal trap 100 of FIGS. 6–9, except that it is: less bulky for easier handling and fabrication, more compact for ease of shipment and economy of material, more elongated and specially designed to fit along walls where rodents like to travel, and is open at both ends to provide an appealing tunnel-like animal trap so that the rodents can see the exit at the opposite end of the trap with a false sense of security before entering the trap.

The compact animal trap 200 has a much smaller feeding chamber or optional, removable bait compartment or tray 202 positioned along side or under the floor of the killing chamber or killing compartment 204 than the animal trap of FIGS. 6–9. In the illustrative embodiment, the bait compartment (feeding chamber) has a floor 206 (FIG. 13) which is in coplanar relationship with and integrally attached to the floor 208 of the killing chamber. The vertical side 210 and horizontal top or ceiling 212 of the bait compartment can be detachably connected to the floor 208 and exterior sidewall 214 of the killing chamber and provide a removable inverted L-shaped cover for the bait compartment. The bait compartment has a rectangular cross-section as viewed from the end of the trap. In the illustrative embodiment, the bait compartment is about 5% to 15% and preferably about 6.25% (1/16) the size and cross-sectional area of the killing chamber. The bait compartment need not be used or can be optionally removed, elimated, or avoided when it is desired to place or spread the bait, such as cheese or peanut butter, on part of the exterior surface of the killing chamber, such as on the underside of the floor or along the exterior wall. In order to attract the animal into the killing chamber, the killing chamber has bait dispensing means in the form of bait holes, apertures or passageways 216 through which the aroma, fragrance and scent of the bait can pass. The bait holes are in communication with the bait.

The animal trap 200 has an elongated tunnel-like killing chamber or compartment 204 with normally open opposite ends 218 and 220 (FIG. 12) that provide rectangular access openings 222 and 224 for entrance of an animal. Each of the ends has a vertically moveable, power-driven door 226 or 228 which is operable from a normally open position, to permit the animal to enter the killing chamber, to a closed position which blocks the access opening to prevent the animal from passing through and exiting the access opening. Each door has an inwardly-facing imperforate, rectangular wall or surface 230 which abuts against and is at least as large as the access opening. Each door is powered by an overhead, vertically positioned, $CO_2$-powered, 100 psi, cylinder, piston and rod 232 or 234. In the illustrative embodiment, each door is U-shaped as viewed from the front of the trap to provide a double layered (paneled) door. Single layered doors can also be used. A safety control, such as a limit switch, can be operatively connected to each door to prevent the door from closing, if an object, such as a child's hand, is positioned in the access opening.

A horizontal kill pad 236 comprising a set of vertically moveable, power-driven spikes 238 provides a downwardly moveable ceiling of the killing chamber. The kill pad extends laterally across and between the ends and sides of the killing chamber. The kill pad has an upper, normally horizontal, floating, spike-supporting pad or plate 240 and a lower, normally horizontal, floating, scraper plate, pad or lateral scraping wall 242. A voluminous set of nails or spikes 238 are fixedly attached to and and depend downwardly from the upper pad and are aligned in registration with and pass through spike-receiving holes or apertures 244 in the lower scraper plate. The upper pad and lower scraper plate have a rectangular shape as viewed from the top of the trap.

The upper pad 240 is connected to and reciprocatingly driven downwardly by overhead, vertically positioned cylinders, pistons and rods, such as by two 100 psi, 7:1 ratio, $CO_2$ power-driven cylinders 246. The cylinders can be connected to the upper pad by flanges 248 and bolts and nuts 250. The cylinders are operatively mounted and supported on a horizontal support plate 251 which is cantilevered from the exterior (rear) wall 252 of the housing 254. The housing encloses, covers and protects the internal parts and components of the animal trap. The support plate also serves as an abutment stop and limit bar as explained below. The upper pad is also supported, biased and urged to its normally upward position by overhead tension springs 256, such as by four 25 pound tension springs. The upper end of the tension springs are connected to an overhead crossbar or ceiling 258 of the housing. The lower end of the tension springs are connected to the upper pad via a mounting flange 260.

Figure 13:
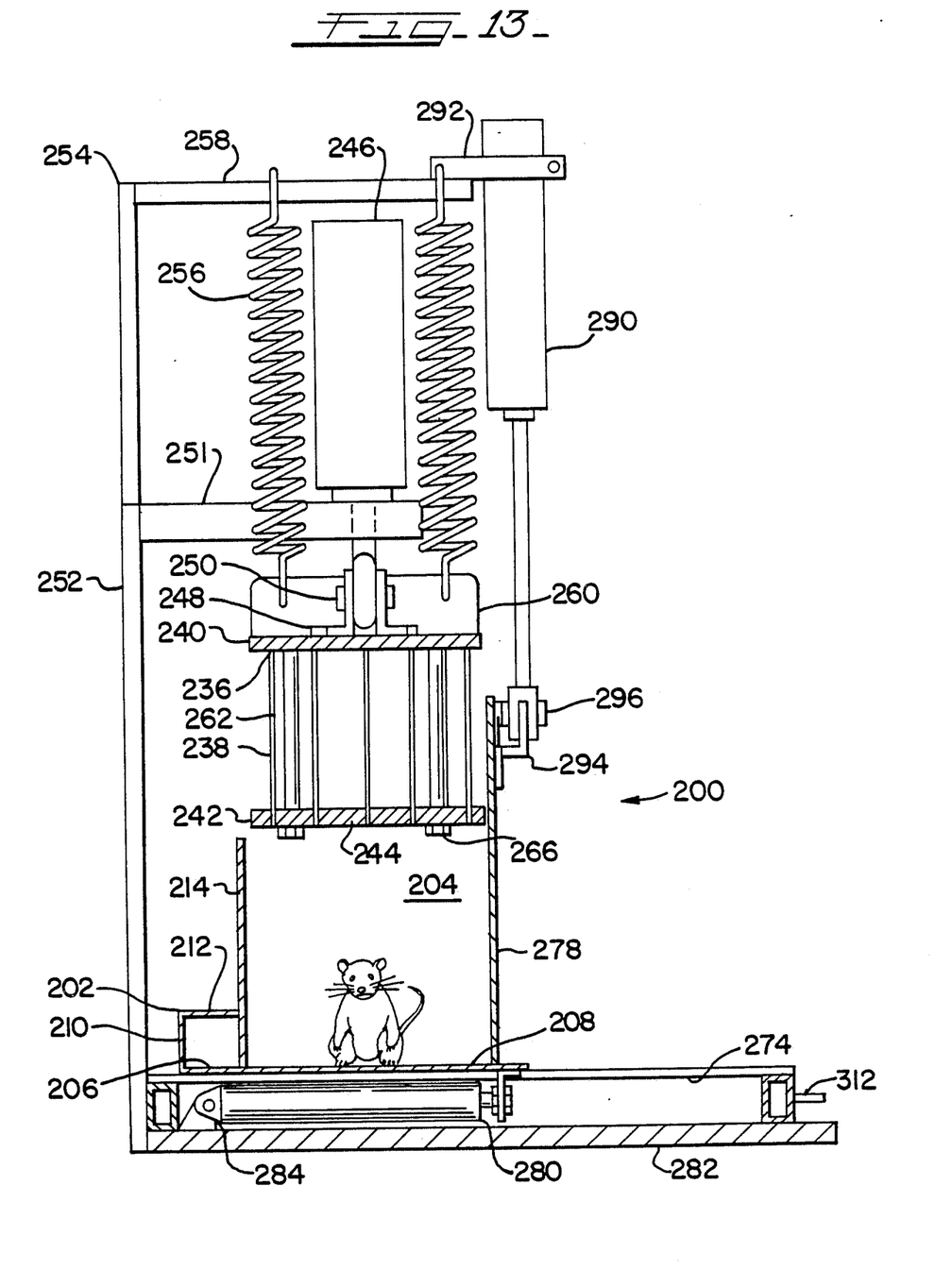
FIG. 13 is a cross-sectional end view of the animal trap taken substantially along line 13—13 of FIG. 12.
Figure 14:
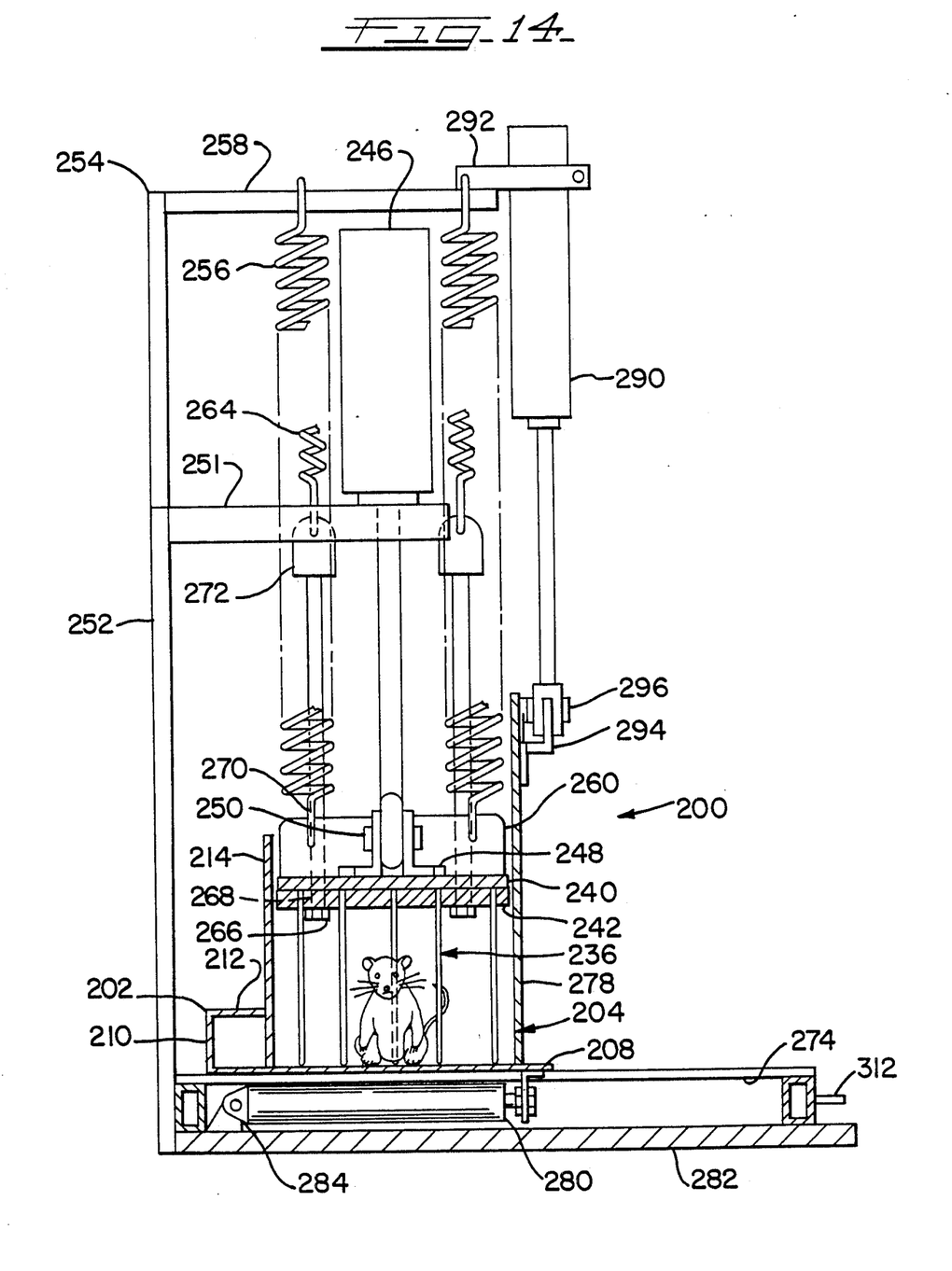
FIG. 14 is a cross-sectional end view of the animal trap during the killing sequence.
Figure 15:
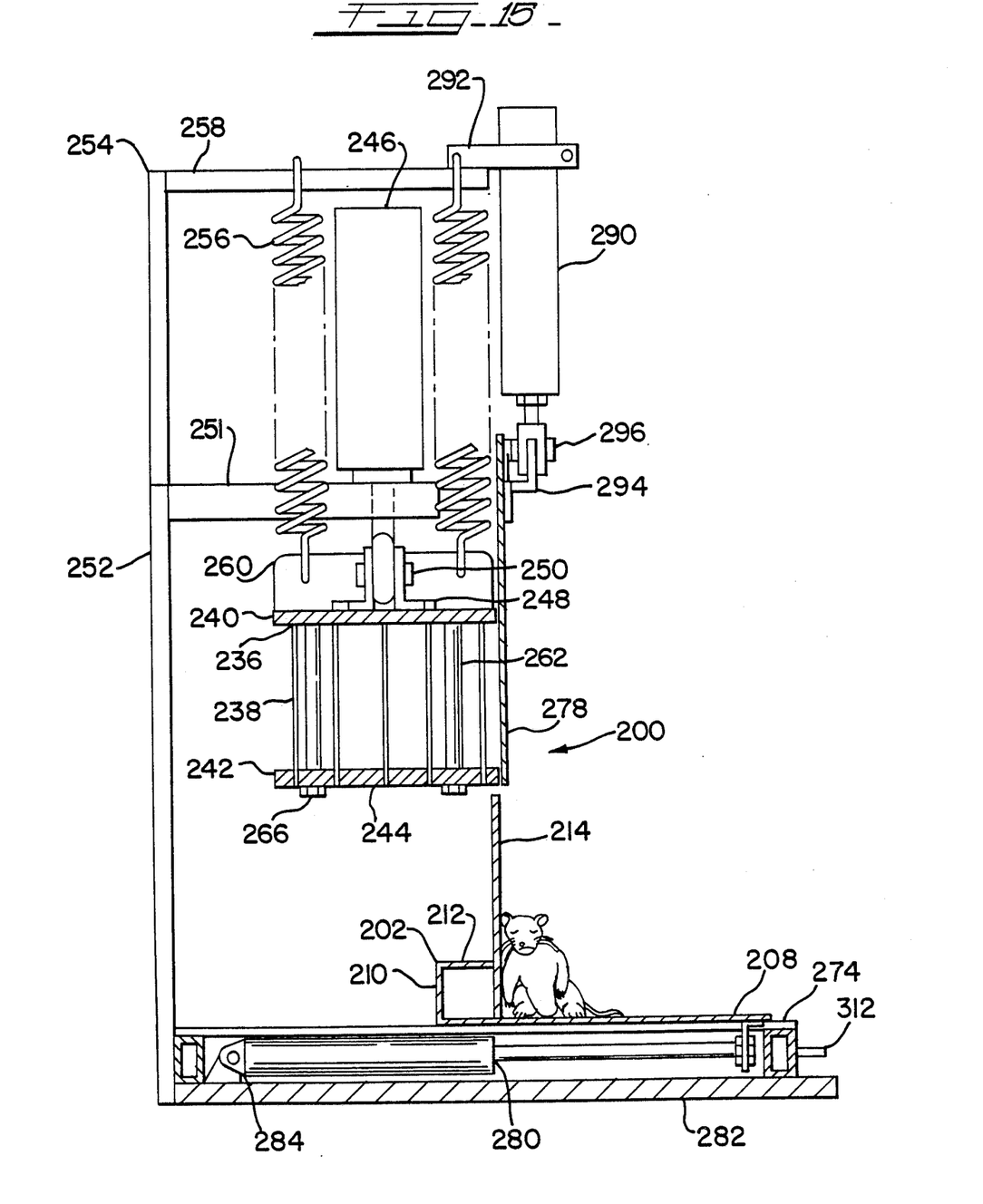
FIG. 15 is a cross-sectional end view of the animal trap showing the animal being pushed towards the discharge chamber.

The lower scraper plate 242 is supported, biased, urged and held in a normally open position, spaced below the upper pad 240, as shown in FIG. 13, by vertical connecting rods 262 and overhead tension springs 264 (FIG. 14). The vertical connecting rods are secured to the underside of the scraper plate by nuts 266, bolt heads or other connecting means. The connecting rods slidably pass through rod-receiving holes 268 in the upper pad and are attached to the lower ends of the tension springs via a hook or connector 270. The upper end of each connecting rod has an abutment stop or block 272 which abuts against the underside of the limit bar 251 to limit the maximum upper position of the scraper plate to a position spaced below the maximum upper position of the upper pad as shown in FIGS. 13 and 15. The upper end of the tension springs are connected to the overhead crossbar or ceiling of the housing.

The kill pad 236 moves from its normally open position as shown in FIG. 13 to its downward killing position as shown in FIG. 14 upon activation of the overhead cylinders. When the upper pad is driven (moved) to its downward killing position (FIG. 12), the upper pad abuts against the scraper plate and the pointed ends of the spikes move in close proximity to the floor of the killing chamber to penetrate and kill the animal. When the kill pad-cylinders are retracted, the scraper plate moves to its upper position (FIG. 15) and the upper pad is sequentially moved to its upper open position (FIG. 15) to withdraw the spikes from the scraper pad. As this occurs, the animal which is held by the spikes abuts and sorapes aqainst the underside of the scraper plate until the spikes are fully withdrawn from the animal whereupon the killed animal will scrape off the scraper plate and fall to the floor of the killing chamber. The scraper plate and upper pad can tilt, move and float in their downward positions via the kill pad-tension springs to accommodate and automatically adjust to different animal sizes and shapes.

In one test unit, the maximum vertical distance that the upper pad moved between its upper open position and its lower kill position was three inches, while the maximum vertical distance that the lower scraper plate moved between its upper open (spaced) position and its lower scraping position was one inch.

The elongated horizontal floor 208 of the killing chamber extends laterally across and preferably slightly beyond the sides of the killing chamber. The floor also extends longitudinally between and in close poximity to the ends of the trap. In the illustrative embodiment, the floor is integrally connected to and in coplanar relationship with the floor of the bait compartment and extends slightly beyond the inner vertical scraper wall (sidewall) of the killing chamber to a position in alignment with the open top of a discharge chamber or disposal compartment 274.

The exterior outer, elongated, upright sidewall 214 and the inner elongated, upright, scraper sidewall 278 provides the sides of the killing chamber. Each of the sidewalls are rectangular, solid, imperforate and vertical. The sides are parallel and extend longitudinally between and in close proximity to the ends of the killing chamber.

The exterior upright sidewall 214 provides a drive wall, push wall and ram, which is welded or otherwise fixedly secured and connected along its bottom edge to the floor 208 of the killing chamber. The drive wall and floor of the killing chamber cooperate with each other to provide a power-driven, laterally moveable, L-shaped pushing compartment and drive member (drive means). The drive wall and floor of the killing chamber are laterally moveable from a normally retracted position as shown in FIG. 11 to provide the outer exterior sidewall and floor of the killing chamber, spaced opposite and away from the discharge (disposal) chamber, to a disposal, pushing or drive position as shown in FIG. 15, when the upright interior scraper wall is its upper open position, to push the killed animal towards and into the discharge chamber. The drive member is driven by cylinders 280, pistons and rods. In the illustrative embodiment, there are two laterally positioned $CO_2$-powered cylinders, pistons and rods mounted horizontally upon the bottom frame or base 282 of the housing at a location generally below the underside fo the floor of the killing chamber. Each rod is connected to the underside of the floor of the killing chamber by a downwardly depending flange 284. The rods are located near the ends of the killing chamber at a location longitudinally outwardly of the discharge chamber. Auxiliary horizontal tension springs can be mounted on the bottom frame or base of the housing to urge and bias the drive member back to its normally retracted position.

The inner sidewall 278 comprises a power-driven, vertically moveable, scraper wall, which provides a solid barrier that normally seaparates the killing chamber from the discharge (disposal) chamber. The scraper wall is vertically and reciprocally moveable from a normally closed scraping position, extending between and vertically separating the killing and discharge chamber to block passage of the animal between the killing and discharge chambers, to an upward open discharge position, when the drive member (push wall and floor of the killing chamber) are in a disposal position, to permit and accommodate passage and disposal of the killed animal from the killing chamber to the discharge chamber. The upright scraper wall is powered by overhead, vertically positioned $CO_2$-powered cylinders 290, pistons and rods. In the illustrative embodiment, each upright scraper wall-cylinder is mounted and supported by an upper plate or beam 292 adjacent the top of the housing and the rod is connected to the upper portion of the upright scraper wall by a flange 294 and nut 296.

Extending downwardly in the intermediate central portion 298 (FIG. 12) of the killing chamber to a position in close proximity to the floor of the killing chamber are retractable, power-driven, vertically moveable, detectors or sensors 300. In the illustrative embodiment, the detectors (sensors) are vertically moveable from a normally lower sensing position near the floor of the killing chamber, to an upper position above and out of the way of the kill pad. Preferably, the detectors are activating trigger switches or tripable feeler switches which comprise a pair of pressure-sensitive, whisker switches (whiskers) or needle valves which are connected to overhead, vertically positioned, $CO_2$-powered cylinders 302, pistons and rods. When the animal brushes against, touches, or moves the whisker switches (needle valves), the switches (valves) are opened and pressure is released in the cylinders. This will trip and activate the logic control $CO_2$ circuit 304 to move the switches (valves) to their upper position so as not to interfer or be damaged by operation of the kill pad.

All the cylinders are operatively connected by pneumatic hoses or tubing 306 to each other as well as to a $CO_2$ supply tank 308 and a pneumatic, $CO_2$-powered, logic control circuit board 310 with one or more valves and limit switches. The $CO_2$ supply tank can be mounted near the ceiling or side of the housing. Tripping of the whisker switches (needle valves) will activate the logic control circuit to commence the sequence of operations and the automatic killing and disposal steps of the animal trap. If desired, other power sources, such as batteries, generators, motors, engines, pumps, or solar energy collectors, can be used with other types of cylinders, such as solenoid-activated electromagnetic cylinders, hydraulic cylinders, etc.

The discharge chamber 274 provides a disposal compartment and bin for storing, disposing and covering the dead animals. In the preferred embodiment, the discharge chamber comprises a removable tray or drawer with a handle 312 which fits along side of the upright scraper wall at a location below the height of the floor of the killing chamber. The drawer is positioned longitudinally inwardly of the drive member-cylinders and springs so as not to interfer with them. A $CO_2$-powered ball indicator, counter and sensor 314 (FIG. 12), or some other type of indicator, can be placed in or near the drawer to indicate the presence and amount of killed animals in the drawer.

In operation, the animal enters either end of the tunnel-like animal trap, either because of curiosity, or because it is using the tunnel as a passage along the wall, and/or because it is attracted to the aroma and scent of the bait permeating the killing chamber. As the animal passes (travels) through the intermediate central portion of the killing chamber, it will contact, trip and trigger the whisker switches. This will activate and energize the logic control circuit and cause the whisker switches to retract and move to their upper position. Simultaneously, the entrance doors will be lowered to their closed position to block the exits (access openings) of the killing chamber and trap.

Thereafter, the kill pad will move to its lower killing position to quickly kill the animal. The kill pad will then return (move) to its upper open position and the lower scraper pad will scrape and remove the dead animal from the spikes causing the carcass of the dead animal to drop (fall) upon the floor of the killing chamber.

Afterwards, the upright scraper wall will move upwardly to its open position and the push wall (drive wall) and floor of the killing chamber will move laterally sideways to their disposal position, with the push wall and upright scraper wall almost in vertical alignment, as shown in FIG. 15, to push the killed animal towards the disposal chamber. Thereafter, the upright scraper wall will move downwardly to its closed position. The push wall and floor of the killing chamber will then retract and move sideways to their initial retracted position. Since the scraper wall is now down, it serves as a barrier to block the return of the dead animal back into the killing chamber, so that the dead animal will abut and scrape against the upright scraper wall. When the drive member (push wall and floor of the killing chamber) have fully returned to their starting position, the dead animal will fall and scrape off the upright scraper wall to fall and be deposited into the discharge (disposal) chamber. The doors will then open and the whisker switches will move downward to their initial (starting) sensing position to reset the trap for the next animal.

Periodically, the drawer or tray of the discharge chamber should be removed to empty the dead animals into a garbage can, bag or other suitable refuse container. After disposal, the empty drawer or tray should be replaced (reinstalled) in the animal trap.

The compact animal trap has been tested and found to be reliable and effective to rapidly exterminate rodents, such as rats and mice, in a safe and efficient manner. The animal trap can also be used to exterminate other animal pests, such as pigeons, crows, rabbits and raccoons.

Although embodiments of the invention have been shown and described, it is to be understood that various modifications and substitutions, as well as rearrangements of parts, can be made by those skilled in the art without departing from the novel spirit and scope of this invention.

What is claimed is:

1. An animal trap, comprising:
    a feeding compartment for attracting an animal with the aroma of bait, said feeding compartment defining an access opening for ingress of said animal into said feeding compartment;
    a killing compartment positioned in generally lateral alignment with said feeding compartment;
    gaseous killing means operatively associated with said killing compartment for killing said animal with a gas in said killing compartment;
    intermediate wall means being moveable from a normally closed position extending between and separating said feeding compartment from said killing compartment to an open position substantially out of said compartments; and
    drive wall means being moveable from one position providing the end wall of said feeding compartment when said intermediate wall means is in said normally closed position to another position when said intermediate wall means is in said open position to move said animal into said killing compartment.

2. An animal trap in accordance with claim 1 wherein said gas substantially comprises carbon dioxide and said animal trap further includes carbon dioxide-powered cylinder means for driving said wall means.

3. An animal trap in coordance with claim 1 wherein said gas substantially comprises nitrogen and said wall means comprise pistons.

4. An animal trap, comprising:
an elongated killing compartment for attracting and killing an animal, said killing compartment providing bait-dispensing means for dispensing the aroma of bait and having at least one access opening defining an entrance;
door means in said access opening being moveable from a normally open position for permitting the animal to enter said killing compartment to a closed position for blocking the access opening to prevent the animal from exiting the access opening;
killing means operatively associated with said killing compartment for killing said animal in said killing compartment;
a discharge compartment for receiving and discharging animals killed in said killing compartment;
upright scraper wall means separating said killing compartment from said discharge compartment, said upright scraper wall means being moveable from a normally closed scraping position for blocking passage of the animal between said killing compartment and said discharge compartment to an open discharge position for accommodating passage and disposal of the animal from said killing compartment to said discharge compartment; and
drive wall means comprising an upright push wall and a floor secured to said push wall, said drive wall means being laterally moveable from a retracted position providing the exterior sidewall and floor of said killing chamber to a disposal position, when said upright scraper wall means is in an open position, for pushing the killed animal towards said discharge compartment.

5. An animal trap in accordance with claim 4 including cylinder means for driving said wall means.

6. An animal trap in accordance with claim 4 inluding piston means for moving said door means.

7. An animal trap in accordance with claim 4 including tripable switch means located in said killing compartment, said tripable switch means being operatively connected to said killing means and said wall means.

8. An animal trap in accordance with claim 4 wherein said killing means includes a set of spikes.

9. An animal trap in accordance with claim 4 wherein said discharge compartment comprises a removable tray.

10. An animal trap in accordance with claim 4 including a bait compartment positioned along side of said killing compartment.

11. An animal trap in accordance with claim 4 wherein said compartments comprise side-by-side compartments.

12. An animal trap, comprising:
an elongated killing chamber having opposite ends, substantially parallel sides extending between and connecting said opposite ends, a ceiling and a floor extending laterally between said sides, each of said opposite ends defining an access opening for entrance of an animal into said killing chamber, said killing chamber having an intermediate central portion located between said opposite ends and defining bait passageways for passage of scent of a bait to attract the animal into said killing chamber;
each of said ends having a vertically moveable, power-driven door operable from a normally open position to permit the animal to enter said killing chamber to a closed position substantially blocking said access opening to prevent the animal from passing through said access opening;
a disposal chamber positioned adjacent one of said sides for receiving and discharging animals killed in said killing chamber;
one of said sides adjacent said disposal chamber comprising a vertically moveable, power-driven, upright scraper wall, said scraper wall being moveable from a normally closed scraping position extending between and separating said killing and disposal chambers for blocking passage of the animal between the killing chamber and the disposal chamber to an upward open position for permitting passage and disposal of the killed animal from said killing chamber to said disposl chamber;
the other of said sides comprising a laterally moveable, power-driven, upright sidewall, said sidewall being fixedly connected to and cooperating with said floor to provide a generally L-shaped pushing compartment and drive member, said sidewall being moveable from a normally retracted position to provide an exterior sidewall of said killing chamber spaced opposite and away from said disposal chamber to a disposal position, when said scraper wall is in said upward open position, to push the killed animal into said disposal chamber;
said ceiling comprising a set of vertically moveable, power-driven spikes for entering into said killing chamber when said doors are closed to impale said animal; and
a detector located in said intermediate central portion of said killing chamber for detecting the presence of an animal in said killing chamber and being operatively connected to and triggering the operation of said spikes, walls and doors when said animal is detected in said killing chamber.

13. An animal trap in accordance with claim 12 wherein said detector comprises vertically moveable, power-driven, pressure-sensitve switches.

14. An animal trap in accordance with claim 12 including power means comprising a generally horizontal cylinder and rod for laterally driving said L-shaped pushing compartment.

15. An animal trap in accordance with claim 12 including power means comprising carbon dioxide-powered pistons for moving said doors, walls and spikes.

16. An animal trap in accordance with claim 12 wherein said disposal chamber comprises a removable drawer positioned at a height below said floor.

17. An animal trap in accordance with claim 16 including a feeding chamber having a floor in substantial coplanar relationship with said floor of said killing chamber, said feeding chamber having a cross-sectional area substantially smaller than the cross-sectional area of said killing chamber as viewed from one of the the ends of said killing chamber.

18. An animal trap in accordance with claim 12 including a vertically moveable, foraminous lateral scraper plate operatively connected to said spikes for scraping and enhancing the removal of the killed animal from said spikes.

19. An animal trap in accordance with claim 18 wherein said animal trap comprises an elongated tunnel.

* * * * *